Nov. 8, 1966    O. D. JOHNSON    3,283,635
ROTARY PUNCHING APPARATUS

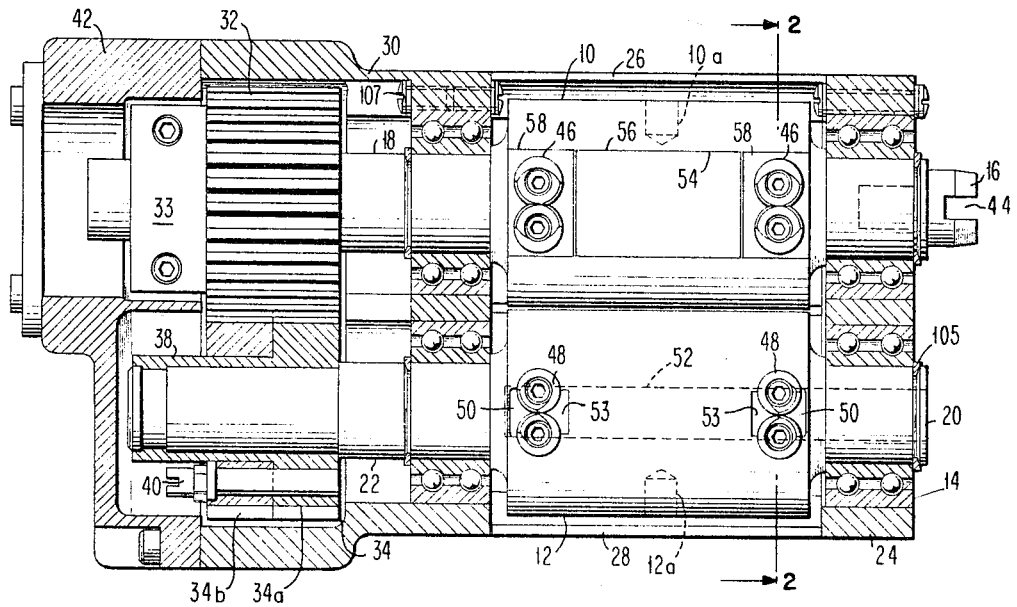
FIG. 1
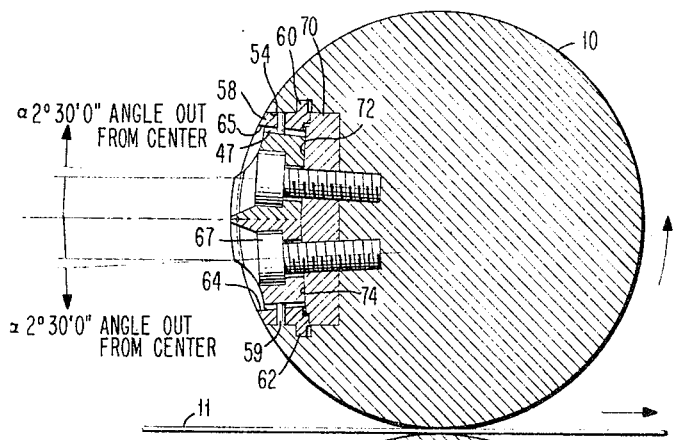
FIG. 2
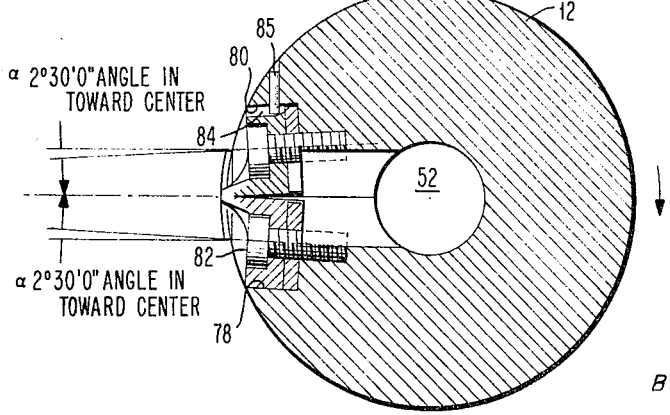
INVENTOR
OLIVER D. JOHNSON
BY Francis V. Giolma
AGENT Nov. 8, 1966　　　　　　O. D. JOHNSON　　　　　3,283,635
ROTARY PUNCHING APPARATUS Filed Dec. 21, 1964　　　　　　　　　　　　5 Sheets-Sheet 2

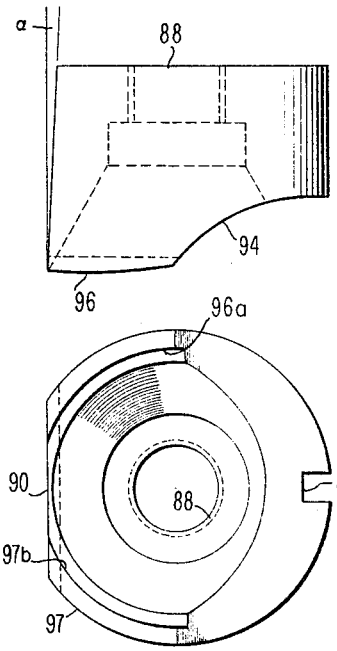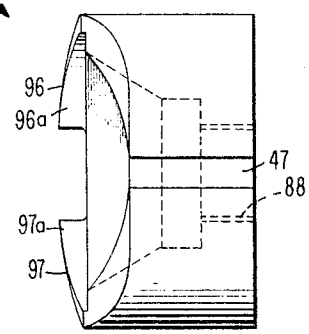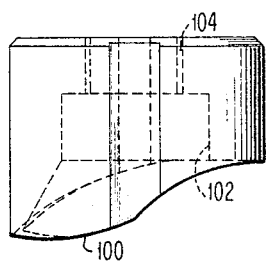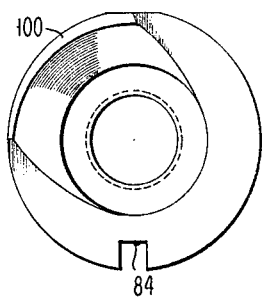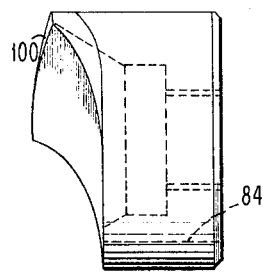

Filed Dec. 21, 1964    5 Sheets-Sheet 4

United States Patent Office 3,283,635
Patented Nov. 8, 1966

3,283,635
ROTARY PUNCHING APPARATUS
Oliver D. Johnson, Vestal, N.Y., assignor to International Business Machines Corporation, New York, N.Y., a corporation of New York
Filed Dec. 21, 1964, Ser. No. 419,875
9 Claims. (Cl. 83—345)

This invention relates generally to rotary punching apparatus and it has reference in particular to apparatus for round cornering tabulating cards.

Traditionally, rotary punch and die tools have been designed with the die of a hard material and the punch of a relatively soft material. Also, the tip diameter of the punch is made slightly larger than the diameter of the die, and the punch tip diameter is undercut. This allows more radial and transverse tolerance in the conventional rotary punch and die shafts, since the punch is normally sheared into the die.

In conventional rotary punch and die systems, the tools are mounted radially and are designed to overlap, i.e. the punch and die as they rotate around in their circular paths overlap when the punch enters the die and the cutting is accomplished. The overlap is necessary to give clean punch and die cutting. However, it is the overlap which gives rise to mechanical problems leading to tool wear and breakdown. Older rotary punch and die tooling methods used a punch that had a larger radius of rotation than the die by the amount of the overlap. Later conventional rotary punch and die methods used a punch and die having the same radius. The interference problem is worse in the older method, but still exists to a significant degree in the newer method. Since the punch and die shafts are usually geared together, they will be rotating at the same speed. From the point that the punch starts to enter the die, until full engagement or overlap is reached at dead center, is where the problem shows up. As the punch and die continue to rotate, the edge of the die cuts into or has interference with the side of the punch. From the point of contact or incidence of the punch and die, the interference of the die tip to the side of the punch rises to a maximum and then decreases to zero as the shafts rotate from the intial point of contact to a position where the punch and die are on dead center. This interference occurs because the velocity of the punch tip is slightly higher than the velocity of the die at the point of contact, even though both punch and die shaft are rotating at the same angular velocity, the difference in velocity being due to a difference in radius at the point of contact. Therefore, the tip of the punch moves faster than the point of contact with the die, and the die cannot get out of the way of the punch. Since these tools are set in their shafts radially, the side of the punch is exposed to the cutting tip of the die and this cutting tip scrapes into the side of the punch during rotation. In a like manner, as the punch and die shafts continue to rotate beyond the dead center position, interference again occurs. Again this interference rises to a maximum and then drops off to zero when the punch and die leave contact. However, in this case it is the punch which has interference with the side of the die. Again the tip velocity of the punch is higher than that of the die at the point of contact, and as the punch and die continue to rotate, the punch scrapes into the side of the die as it is coming out of contact with the die. The edge of the die is exposed to the scraping effect since it is mounted radially in the holder.

Accordingly, a principal object of the present invention is to provide an improved rotary web feeding and punching tool.

Another object of the invention is to provide, in a rotary punch and die device, for tipping the punch and die to eliminate the usual toe and heel interference effects.

Yet another object of the invention is to provide a non-contacting rotary punch and die tool having overlapping punch and die elements.

More specifically, it is an object of the invention to provide for tilting mating punch and die elements in opposite directions to eliminate interference between the punch and die elements during a punching operation.

It is an important object of the present invention to use non-contacting, overlapping rotary punch and die elements that are both of a hard material to provide a long life and clean cutting.

Yet another object of the invention is to provide a rotary web feeding and punching tool made of a low coefficient of expansion material so as to maintain close running tolerances and minimize variations in card length.

Still another object of the invention is to provide in a rotary web feeding and punching tool for maintaining an accurate relation between roll centers throughout the operating range.

A further object of the invention is to provide a rotary web feeding and punching tool that is substantially unaffected by temperature changes from startup to running temperature.

Another important object of this invention is to provide for inclining or tilting the leading edge of a rotary punch in a peripheral direction relative to a radius of rotation from the tip in a direction against the direction of rotation by an angle equal to the angle included between the leading edge of the punch and a line joining the tip of the punch and the tip of the mating die when the interference between the die tip and punch is a maximum.

It is also an important object of the present invention to use mating pairs of substantially cylindrical punch and die buttons having peripheral lip portions defining arcuate V-shaped cutting edges and located in adjoining bores in related punch and die rolls, the bores in the punch roll being disposed on opposite sides peripherally of a common punch roll radius therebetween and inclined away therefrom in a peripheral direction; the bores in the die roll being inclined in a peripheral direction towards a common die roll radius therebetween by the same angle.

In practicing the invention in accordance with a preferred embodiment, a pair of rolls of a high nickel steel alloy are rotatably supported in a rigid frame of the same material in spaced relation for feeding a web of card material therebetween, being interconnected in driving relation by means of mating gears mounted on the roll shafts, one of the shafts having a slotted driving connection with suitable driving means.

One roll is provided adjacent opposite ends thereof with a pair of cylindrical bores which are tilted toward a common radius by an angle α, the bores being on opposite sides in a peripheral direction of the common radius. Hardened die buttons having relieved end surfaces to provide mating lip portions defining an arcuate V-shaped die are secured in the bores at each end for cooperating with mating punch members to cut arcuate V-shaped notches out of the edges of the web as it passes between the rolls.

The other roll is provided with axially aligned slots at opposite ends in which are adjustably secured punch locator blocks having cylindrical bores on opposite sides of a common radius therebetween and which are inclined by the angle α away from the common radius. Cylindrical hardened punch buttons are positioned in the bores and are secured to the roll by screws that also secure the punch block in position. The punch buttons have relieved end portions defining arcuate V-shaped cutting edges mating with the corresponding die button portions. The angle α referred to is defined as the angle included by the leading edge of the untilted punch and a line joining the tips of the leading edges of the untilted punch and die when the interference between the die tip and the punch is a maximum.

The foregoing and other objects, features and advantages of the invention will be apparent from the following more particular description of preferred embodiments of the invention, as illustrated in the accompanying drawings.

In the drawings:

FIG. 1 is a reduced size sectional view in elevation of a rotary web feed and punch device embodying the invention in one of its forms.

FIG. 2 is an enlarged partial cross-sectional view taken along the line 2—2 of FIG. 1 showing the relationship of the punch and die members in the rolls.

FIG. 5a is an enlarged top view of a punch button of FIGS. 1 and 2.

FIG. 5b is a rear elevational view of the punch button of FIG. 5a.

FIG. 5c is a side elevational view of the punch button of FIG. 5a.

FIG. 6a is an enlarged top view of a corresponding die button.

FIG. 6b is a rear elevational view of the die button of FIG. 6a.

FIG. 6c is a side elevational view of the die button of FIG. 6a.

Figure 3:
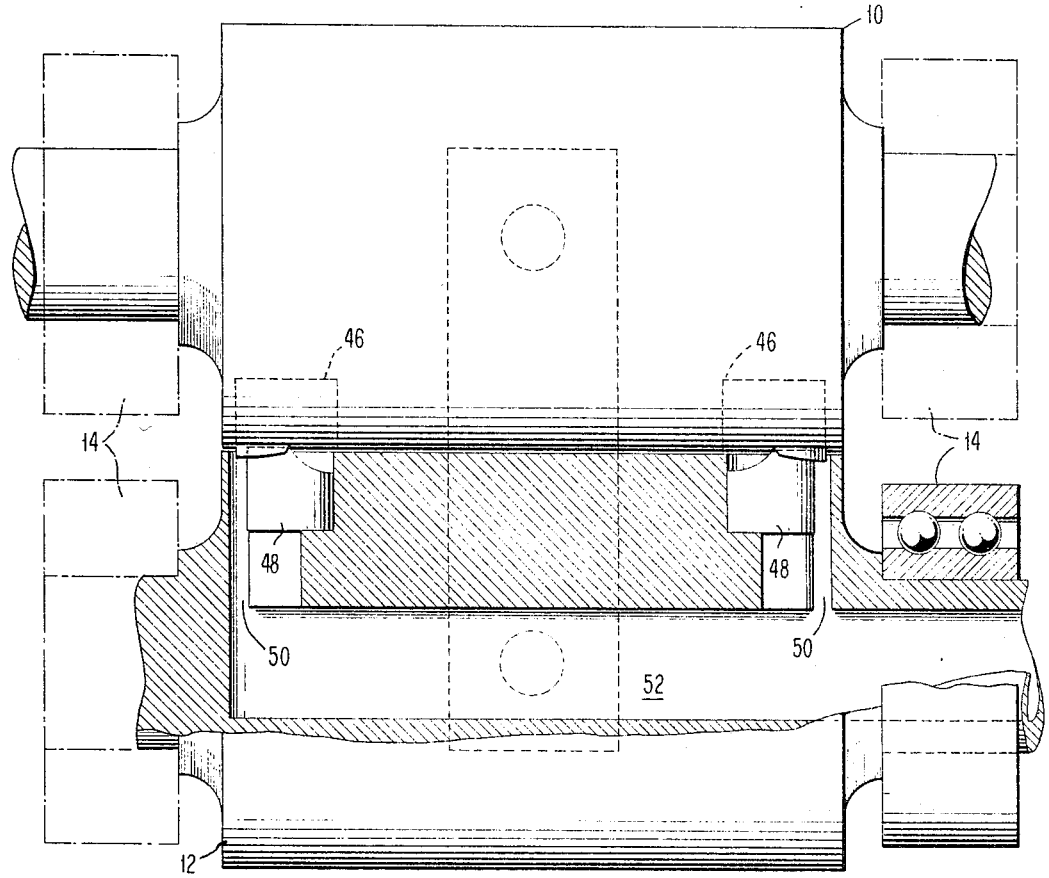
FIG. 3 is an enlarged partially sectioned, part elevational view of the punch and die rolls with the punch and die members in the punching position.

Referring particularly to FIG. 1, it will be seen that a pair of feed rolls 10 and 12 for feeding a web of tabulating card material therebetween is disposed in predetermined spaced relation by means of bearings 14 which are disposed on reduced shaft extensions 16, 18 and 20, 22, respectively. The bearings 14 on the shaft extensions 16 and 20 are supported in an open support comprising a substantially L-shaped member consisting of a support plate 24 having a pair of parallel legs 26, 28, extending therefrom with space therebetween to permit the passage of the web. The bearings 14 on the shaft extensions 18 and 22 at the other ends of the roll are supported in an enclosed housing member 30 which is secured to the outer ends of the legs 26 and 28 by means of screws, not shown. The housing 30 also houses a precision gear 32 secured to the shaft extension 18 of the punch roll by clamp means 33 and a mating precision gear 34 which is secured to the extension 22 of the die roll. The gear 32 is of a one piece construction, while the mating gear 34 is of a split construction, having a portion 34a of the gear provided with an integral hub extension 38 on which is rotatably mounted an adjustable portion 34b connected thereto by means of an eccentric adjustment screw 40 which permits rotating slightly the portion 34b relative to the portion 34a to eliminate backlash. The housing portion 30 is provided with a cover 42 which encloses the gears. The shaft extension 16 of the punch roll is provided with a slot 44 for effecting driving engagement with a suitable driving shaft, and the support plate 24 is provided with holes, not shown, for receiving bolts securing the complete assembly to the frame of a rotary card manufacturing machine with which it is used.

As shown, the punch roll 10 is provided with a punch member comprising a pair of substantially cylindrical punch buttons 46 at each end of the roll for cooperating with a mating die member comprising a pair of buttons 48 similarly located on the die roll 12 for removing at a point which is to form the dividing line between adjacent cards, substantially arcuate V-shaped portions from opposite edges of the web of card material as it passes between the rolls. Substantially triangular ports 50 are provided immediately adjacent the die buttons 48 towards the outer ends of the rolls for removing the arcuate V-shaped chips cut from the web. These ports connect with a central opening 52 in the die shaft 20 which may be connected to a suitable vacuum source through a duct, not shown. Portions 53 are removed from the roll surface adjacent the inner edges of the die buttons 48 to provide the necessary clearance between the die roll and the inner portions of buttons 46.

As shown in the FIGS. 1 and 2, the punch roll 10 is provided with an accurately ground and centered axial slot 54 throughout its length which is provided with a filler block 56 intermediate the ends, leaving room at the ends for punch locator blocks 58 which are slidably disposed in the open end portions of the slot 54, being secured slidably therein by means of projecting ledge portions 60 adjacent the bottom which fit in grooves 62 in the walls of the slot 54. The locator blocks 58 are provided with intersecting adjacent cylindrical bores 64 and 65 for receiving the punch buttons 46, the bores being inclined out or away from a common central roll radius by an angle α, the calculation of which will be explained hereinafter. Screws 67 pass through centrally located openings in the punch buttons 46 and are threaded into the shaft end for securing the buttons in place. The buttons 46 rest on support blocks 70 located in the bottom of the slot 54. The outer surface of support block 70 has oppositely inclined surface portions which are inclined at the same angle α to the inner surface, to provide a flat support for the bottoms of the punch buttons 46. Keyways 47 in the punch buttons 46 and dowel pins 59 in the locator blocks 58 secure the buttons against rotation.

The die buttons 48 which are also substantially cylindrical, fit directly into precision bored holes intersecting 78 and 80 which are positioned on opposite sides peripherally of a common central die roll radius, and are inclined at the angle α toward the radius in a direction away from the center of the roll. The die buttons 48 are secured to the roll by means of screws 82 and may be secured against rotation in the bores by means, such the keyway 84, which receives a pin 85 or other projection suitably positioned in the roll 12.

Referring to FIGS. 5a through 5c, it will be seen that the punch buttons 46 comprise substantially cylindrical button members of a hard material having central fitted openings 88 for receiving the screws 67 with sufficient clearance to permit adjustments of the buttons in an axial direction. The buttons 46 are provided with flattened surface portions 90, which are inclined to the central axis by the angle α referred to, to provide mating surfaces between each pair of buttons. A keyway 47 prevents rotation of the button in the locator block. The top or outer end of the button is relieved adjacent one side to provide an upwardly sloping surface 94 for approximately half of the circumference of the block for the purpose of defining opposed arcuate peripheral lip portions 96 and 97, the upper surface of which has a curvature of a radius slightly larger than, but substantially parallel to the roll surface. When a pair of the buttons is placed in mating arrangement, as shown in FIG. 1, the lip portions 96 and 97 of the adjoining buttons project from the roll and define substantially arcuate V-shaped punch edges. The punch button 46 is counterbored to provide an inner cutting surface 96a on the inside edge of the lip 96 and a corresponding cutting surface 97a along the inside of the lip 97, for cooperating with the mating die buttons 48.

Referring to FIGS. 6a through 6c, it will be seen that the die button 48 also comprises a substantially cylindrical button of a hard material, the end surface of which is relieved for approximately 270° of the periphery to define a substantially quadrant punch lip portion 100, which mates with one of the surface edges 96a or 97a of the punch button. The button 48 is counterbored at 102 to provide for the head of a screw 82 which secures the button in place, the counterbore 102, connecting with an opening 104 through which the screw passes.

The over-all design of the rotary web feed and punch unit herein disclosed permits holding the precise relationship of the punch to die throughout the normal range of operating temperatures. Referring generally to FIG. 1, it will be seen that the die buttons 48 are fixed rigidly to the die shaft assembly of roll 12 and shaft extensions 20 and 22, and this die shaft assembly is held rigidly to the frame by use of double row preloaded ball bearings 14, spring lock washers 105 and screws 107. Both the die shaft assembly and the frame are made of especially formulated high nickel steel containing approximately 36% nickel. This steel has a linear thermal coefficient of expansion of $.8 \times 10^{-6}$ which is approximately ⅛ that of normal steels. This combination of the use of high nickel steel and preloaded bearings which have no end play ensures that the die will remain in the same position throughout the entire operating range of the unit, which would be from 70° F. to approximately 150° F. Similarly, the punch shaft assembly of roll 10 and shaft extension 16 and 18 is rigidly secured to the frame. However, since the punches 46 are contained in the slidable locator block 58, they are adjustable along the axis of the roll 10. The adjustable punch feature permits compensation for inaccuracies in assembly.

Figure 4:
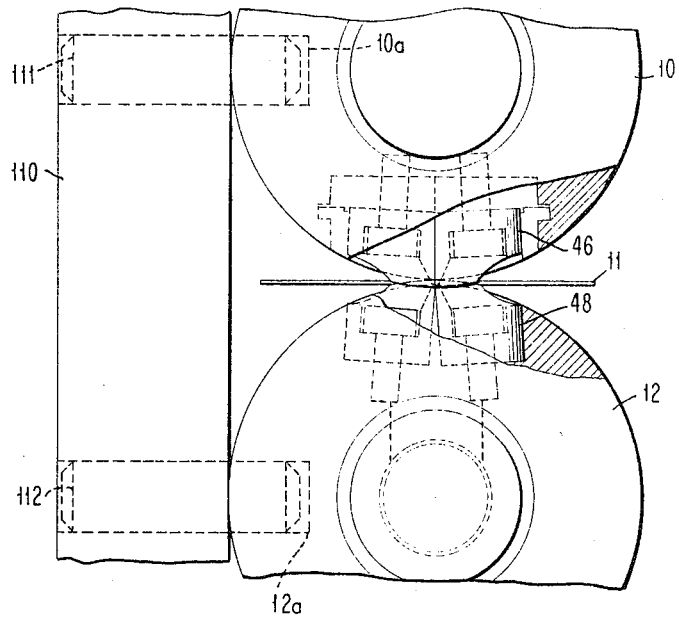
FIG. 4 is an enlarged partly sectioned end elevational view of the punch and die rolls showing an aligning tool in position.

Both the punch roll 10 and the die roll 12 are provided with accurately ground assembly holes 10a and 12a, respectively, which are used in aligning the assembly. In the initial setup of the adjustment of the unit, the punches 46 are moved back towards the ends of the roll so that they will not contact the dies, and the clamp member 33 of the gear 32 is loosened. The rolls may then be moved relative to one another and are located accurately as shown in FIGS. 3 and 4, by means of a block gauge 110 having accurately spaced pins 111 and 112 which are positioned in the holes 10a and 12a of the rolls to accurately locate the rolls. The clamp member 33 is then tightened, after the eccentric adjusting screw 40 of the split gear 34–36 is adjusted for zero backlash in this position. Punch adjustment is made with the rolls in the position shown in FIG. 1. The punch blocks 58 are adjusted axially by loosening the screws 67 and moving the slidable locator blocks towards the center of the shaft. In checking the unit for cutting, a piece of lens tissue, approximately .001 inch thick, would be fed through the rolls in the area of punching and the rolls would be turned over by hand. If the lens tissue did not cut, then the adjustment procedure would be repeated; that is, we would loosen the hold-down screws 67 and move the blocks 58 approximately .001 inch closer to the dies using a feeler gauge, and retighten the hold-down screws. This procedure would be repeated until the lens tissue was cut finally.

In operation, a web of card stock 11, .007 inch thick, would be fed into the unit. Then it would be given its driving torque through the slotted shaft projection 16. As the unit rotates, the punches overlap the dies on the edge of the web to produce intersecting quarter-circular cuts defining the arcuate V-shaped cut on either side of the web once during each revolution. The material or chip removed is sucked by vacuum down through the ports 50 adjacent the dies, the chip is then carried through the hollow die shaft and through suitable vacuum tubing to be collected in a chip can in a well-known manner.

The unit also acts as a fixed center web feeding device. Conventionally, web feed devices have been designed with an adjustable and variable center distance. This was necessary due to inaccuracies in these systems and thermal expansion problems. As these units operate, the heat build-up increases the diameter of their steel rolls normally at a rate higher than the frames will expand. The end result is that the larger feed roll diameter would increase the amount of squeeze on the web and thereby cause the system to feed an increased length of web. In the device disclosed herein, the diameters of the shafts and center distances therebetween are held to very close tolerances. Also, the center distance is such that the rolls have a .005 inch gap between them. This combination of dimensions and tolerances allows us to feed a length of card stock of 7.375 inches per shaft revolution much more consistently than ever before possible using conventional steel frames and shafts.

Previous designs at fixed center distances have not been practical, and have failed to give sufficient accuracy for the manufacture of tabulating cards. A rotary web feed and punching device embodying the invention as described has been successfully used in production for feeding and round cornering card material for producing in excess of 12 million tabulating cards, without appreciable wear of either punch or die.

Figure 9:
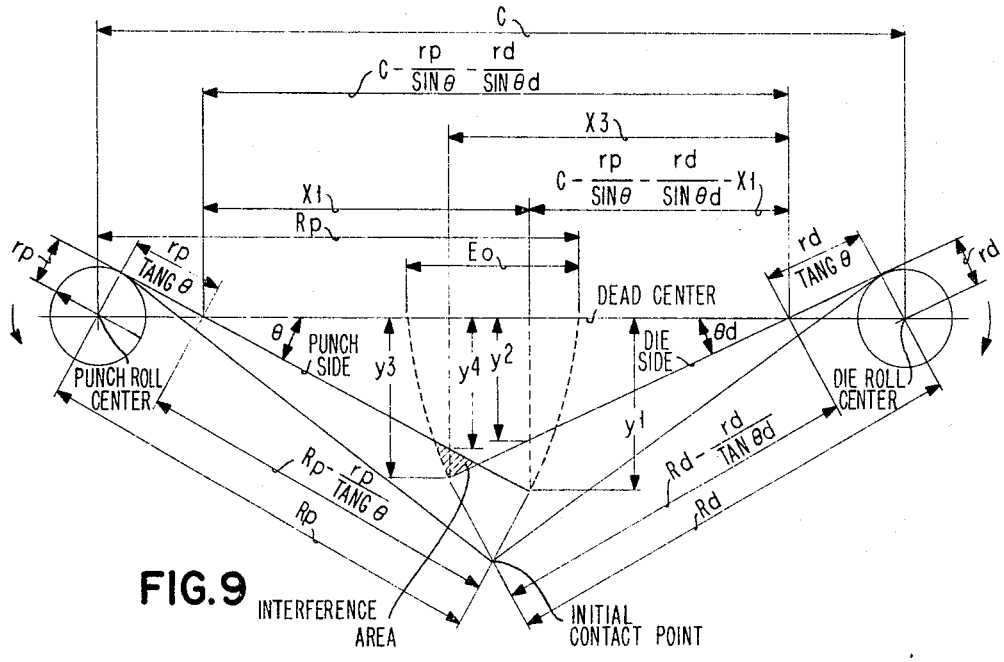
FIG. 9 is a schematic diagram showing the relationship of the punch and die leading edges, and marked for use in deriving the calculations for the angle α.
Figure 10:
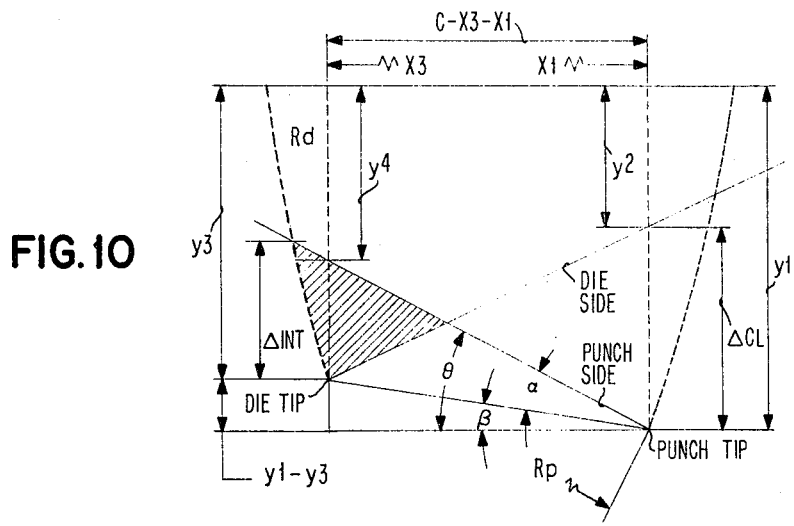
FIG. 10 is an enlarged partial view of the portion of FIG. 9 where the punch and die edges intersect.

The rotary web feeding and punch device herein disclosed eliminates the "toe" and "heel" effect by putting the punches and the dies on equal but alternate angles in the plane that the "toe" and "heel" effect occurs. The actual angle which is used in tipping these tools is derived from the general case of interference and clearance of the punch and die tips. FIGS. 9 and 10 of the drawings are schematic diagrams representing the general case and the equations are derived from this to determine the angle of tipping as shown below. As mentioned before and shown in FIG. 11, the punch and die interference rises from zero at the initial point of contact to a maximum and then diminishes to zero at dead center. Also, while the die is digging into the side of the punch, the punch tip has clearance with respect to the side of the die. The purpose of these equations is to determine the angle at which the punch would have to be tipped in order to miss side contact with the die at the point of maximum die tip to punch side interference.

In the following calculations:

$E_0$ is the overlap or punch engagement;
$C$ is the center distance between the shafts;
$r_p$ is the radius of the round punch;
$r_d$ is the radius of the round die;
$R_p$ is the radius from the center of the punch shaft to the tip of the punch;
$R_d$ is the radius from the center of the die shaft to the tip of the die;

$$x_1 = \left[ R_p - \frac{r_p}{\tan \theta} \right] \cos \theta$$

$$y_1 = \left[ R_p - \frac{r_p}{\tan \theta} \right] \sin \theta$$

$$x_2 = C - \frac{r_p}{\sin \theta} - \frac{r_p}{\sin \theta_d} - x_1 = C - \frac{r_p}{\sin \theta} - \frac{r_d}{\sin \theta_d}$$

$$- R_p \cos \theta + \frac{r_p \cos \theta}{\tan \theta}$$

$$y_2 = x_2 \tan \theta_d$$

$$y_2 = C \tan \theta_d - \frac{r_p}{\sin \theta} \tan \theta_d - \frac{r_d}{\cos \theta_d} - R_p \cos \theta \tan \theta_d$$

$$+ r_p \frac{\cos \theta}{\tan \theta} \tan \theta_d$$

The clearance between the punch tip and the side of the die $\Delta_{cl}=y_1-y_2$.

$$\Delta_{cl}=R_p \sin\theta - \frac{r_p \sin\theta}{\tan\theta} - C\tan\theta_d + \frac{r_p}{\sin\theta}\tan\theta_d$$
$$+ \frac{r_p}{\cos\theta_d} + R_p \cos\theta \tan\theta_d - r_p \frac{\cos\theta}{\tan\theta}\tan\theta_d$$

$$\Delta_{cl}=R_p(\sin\theta+\cos\theta\tan\theta_d)-C\tan\theta_d$$
$$+r_p\left(\cos\theta+\frac{\tan\theta_d}{\sin\theta}-\cos\theta\frac{\tan\theta_d}{\tan\theta}\right)+\frac{r_d}{\cos\theta_d}$$

For $r_p=r_d=0$, which is true at the tip or nip of the punch where the two quadrant lip sections intersect, the following conditions are true:

$$\Delta_{cl}=R_p(\sin\theta+\cos\theta\tan\theta_d)-C\tan\theta_d$$

where $C=R_p-E_0+R_d$ $$\Delta_{cl}=R_p(\sin\theta+\cos\theta\tan\theta_d)-(R_p-E_0+R_d)\tan\theta_d$$

For symmetrical interference and clearance where $R_p=R_d$ and $\theta=\theta_d$, $$\Delta_{cl}=2R_p\sin\theta-(2R_p-E_0)\tan\theta$$

Therefore, $\Delta_{cl}=2R_p(\sin\theta-\tan\theta)+E_0\tan\theta$

Through similar derivations, it may be shown that $$\Delta_{int}=2R_p(\sin\theta-\tan\theta)+E_0\tan\theta$$

Figure 11:
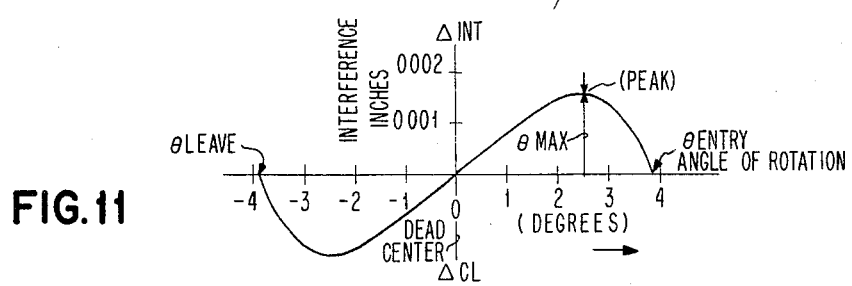
FIG. 11 is a curve showing the relationship of the punch and die interference and clearance throughout the angle from initial contact to separation.

Either by derivation, or by plotting the tip interference against the angle $\theta$, it will be found, as shown in FIG. 11, that the maximum interference occurs approximately ⅓ of the way between the initial point of contact and reaching the dead center line between the rolls. For example, in the particular arrangement shown in FIG. 1, the angle of maximum interference was found to be 2°30′. It will be realized that, in any given situation, the magnitude of the parameters, such as center distance, overlap and tool size will vary according to the need. However, the basic theory of arriving at an angle to tip the tool will remain the same.

In the application at hand, the end result desired was a cut consisting of two intersecting quarter circles on either side of the web directly opposite each other at the line of demarcation between adjoining cards. This was accomplished by using two punches and dies arranged as shown on either end of the rolls. The punches in this case overlap the dies on their outside surfaces. These punches have a flat on the side which is to be mated with the adjacent punch. This flat is ground in the tipping angle of 2°30′. Therefore, when these punches are inserted in the tool shaft as shown, they have a total included angle of 5° away from each other in the plane of tipping. Similarly, the dies have a flat ground on their dies, these dies however, are tipped toward each other in a plane of tipping at an angle of 2°30′ or a total included angle of 5°. By thus tipping the punches and dies, there will be no interference between the punch and die, from a position of initial contact through dead center and beyond until the punch cycle is complete. The tipping of the punches and dies on alternate angles of 2°30′ in the design of the punches and dies shown has allowed the very desirable advantage of non-contacting punches and dies. This is accomplished by bringing the cutting edges of the punches very close to (.001 inch or less) but not touching the cutting surfaces of the dies. The foremost advantage of the non-contacting geometry of these tools is that it enables the use of hard punches as well as hard dies. This is an advantage not obtainable previously because a "toe" and "heel" effect cannot be permitted when both mating parts are hard. The "toe" and "heel" effect working on hard mating parts would chip off the cutting edges very early, if not immediately, in their life cycle. This is the reason that conventional rotary punch and die units have used a soft punch and a hard die.

Figure 7A:
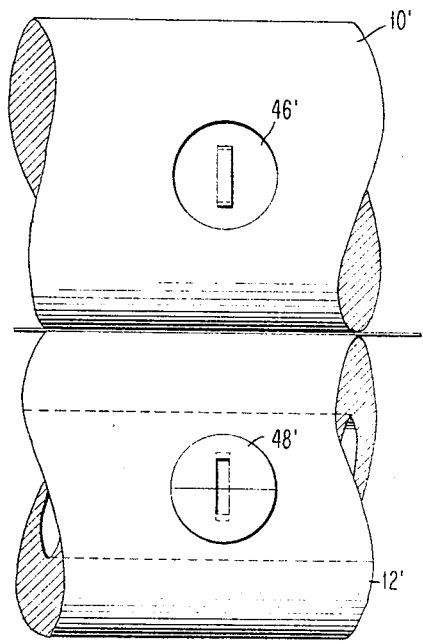
FIGS. 7a and 7b are partial front elevational and cross-sectional views of a different embodiment of the invention applied to a rectangular rotary punch and die arrangement.
Figure 7B:
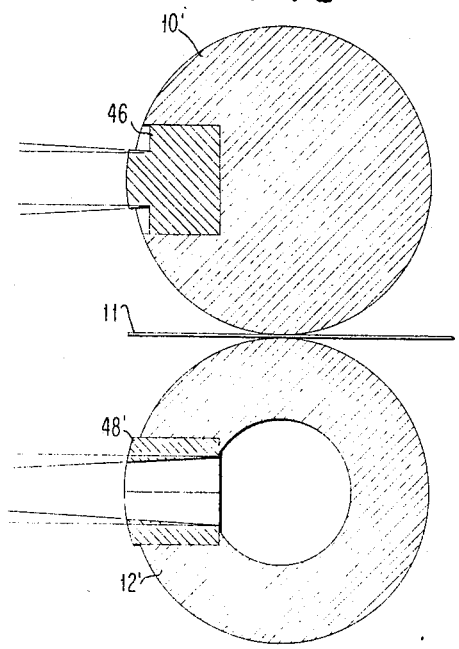

Referring to FIGS. 7a and 7b, there is shown an arrangement for a rectangular punch and die in which a punch roll 10′ and a die roll 12′ are provided with punch and die buttons 46′ and 48′. The punch button has leading and trailing edges inclined by an angle α, away from a common central roll radius, and the die button 48′ has leading and trailing die edges sloped toward a common central roll radius in accordance with the teachings of the invention. The die button is shown as split to enable obtaining the inclined inner edge portions by machining the mating surfaces at the split.

Figure 8A:
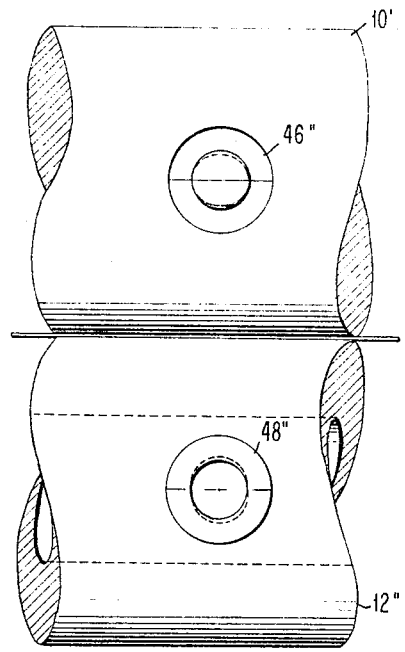
FIGS. 8a and 8b show partial front elevational and cross-sectional views of still a further embodiment of the invention as applied to round rotary punch and die arrangements.
Figure 8B:
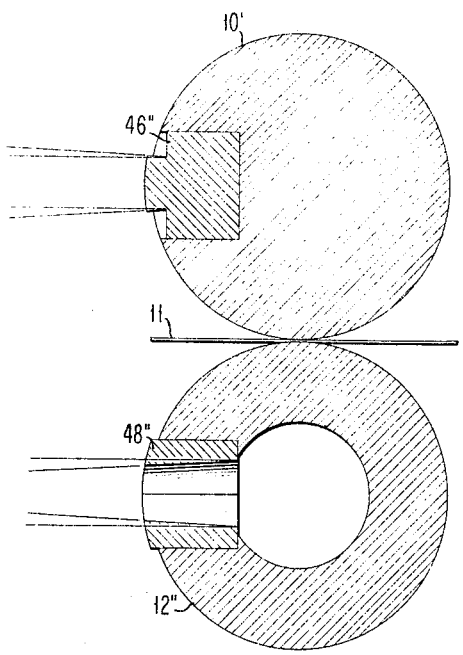

Referring to FIGS. 8a and 8b, there is shown an arrangement in which punch and die rolls 10′ and 12′ may be provided with cooperating circular punch and die buttons 46″ and 48″ respectively. The buttons in both instances have a split construction, with the mating surfaces being machined to provide for the tipping toward each other in the case of the die and away from each other in the case of the punch. The outer surfaces of the buttons may be ground or machined afterward to provide a cylindrical outer surface for mounting in the respective rolls.

The curve shown in FIG. 11 depicts the relation between the angle of the punch and the interference between the punch and die for an overlap of .005 inch. This relation was obtained with a rotary web feed and punching device having C, the center line between the punch and the die rolls=2.32 inches; $R_d$ the radius from the center of the die shaft to the tip of the die=1.171 inches; $R_p$ the radius from the center of the punching shaft to the tip of the punch=1.176 inches; the roll separation=.005 inch. The die and the punch each project approximately .005 inch from the roll, and the card stock being punched is .007 inch thick. For these values, the angle $\theta$ at the point of initial contact is 3.7°, and the angle $\theta$ for the maximum interference is 2.1°. From this it will be realized that the schematic diagrams of FIGS. 9 and 10 are not to scale, but have been exaggerated in order to obtain identifiable values for the different quantities involved.

From the above description and the accompanying drawings, it will be seen that we have provided a rotary web feed and punching device utilizing a new and novel method of tipping the punch and die at alternate angles to eliminate the "toe" and "heel" effect. In addition, a rotary punching device is provided having overlapping, non-contacting and fully hardened punches and dies of heat treated tool steel or the like, having a hardness on the Rockwell C scale of 50 or above, for example, instead of requiring the usual soft punch and hard die arrangement. The particular construction and arrangement shown results in a fixed center distance web feeding device which meets the highest accuracy requirements and maintains precision tool alignment from start-up to running conditions. The results of the disclosed construction provide the dual results of long tool life combined with a high quality of shear cutting action. The non-contacting principle of rotary punching thereby permitted, enables the use of fully hardened tool elements. This method is combined with punching and feeding features into a single unit eliminating the need of a separate unit for feeding and punching, as was obtained in previous designs.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A rotary tool device comprising,
    a pair of rolls disposed on opposite sides of a web of material,
    means for connecting the rolls and driving them in opposite directions;
    complementary punch and die members mounted one in each of said rolls;
    at least one of said members projecting to provide overlapping portions thereof for punching the web, said punch and die members each having opposite edge portions, those of the punch members being inclined relative to each other in one sense and those of the die member being inclined relative to each other in the opposite peripheral sense in a common plane passing through a centerline between the rolls so as to provide oppositely inclined punch and die portions to eliminate toe and heel interference between the punch and die members.

2. A rotary web feed and punching device comprising,
a pair of feed rolls disposed in predetermined spaced relation to feed a web of material positioned therebetween,
gear means connecting the rolls to drive them in opposite directions,
complementary non-contacting, overlapping cylindrical punch and die members carried one by each roll, at least one of said members projecting from its roll to provide an overlapping relation with the other for punching said web material,
said punch member being mounted with its cylindrical axis inclined in one direction and the die member with its cylindrical axis inclined in the other direction in a plane through a common centerline between the rolls to eliminate interference between overlapping portions of the punch and die members.

3. In a rotary web feeding and punching tool,
a pair of feed rolls disposed in side by side spaced apart relation for feeding a web of material therebetween,
complementary punch and die members carried one by each of different ones of the rolls in non-contacting, overlapping relation for making adjoining arcuate cuts adjacent an edge of the web at spaced intervals to provide rounded corners at said intervals,
each die member comprising a pair of adjacent substantially cylindrical buttons positioned in circular bores in one of the rolls which are inclined at opposite angles toward a common central roll radius and having adjoining peripheral lip portions defining the die,
each punch member comprising a pair of adjoining substantially cylindrical buttons positioned in circular bores in the other roll and which are inclined away from a common central roll radius and having peripheral edge portions projecting from the roll and mating with the lip portions of the die.

4. In a rotary punch,
a pair of rolls disposed in predetermined spaced relation,
mating punch and die members carried by different ones of the rolls,
at least one of said members projecting sufficiently to establish an overlapping punch and die relation,
said die comprising a pair of similar substantially cylindrical buttons positioned on opposite sides of and inclined toward a common roll radius therebetween in a plane perpendicular to the axis of the die roll, said buttons having raised peripheral lip portions defining the die edge, and
said punch comprising a pair of substantially cylindrical buttons positioned on opposite sides of and inclined away from a common radius in the same plane.

5. In a rotary punch for a web of material,
a pair of rolls disposed in predetermined spaced relation on opposite sides of the web for feeding the web,
complementary punch and die members carried by the rolls adjacent the edge of the web, one of said members projecting from its associated roll sufficiently to provide an overlapping relation between the members,
the die comprising a pair of substantially cylindrical buttons positioned on opposite sides of a common die roll radius in a plane perpendicular to the roll axis and inclined toward the common radius by an angle $\alpha$, said buttons having juxtaposed upstanding peripheral lip portions defining the die and the punch comprising a pair of substantially cylindrical buttons positioned on opposite sides of and inclined away from a common punch roll radius by the angle $\alpha$, said angle $\alpha$ being the angle between the leading edge of the punch and a line joining the tip of the leading edge of the punch and the tip of the leading edge of the die when the interference between these leading edges is substantially a maximum.

6. A rotary device comprising,
a pair of elongated feed rolls disposed in predetermined spaced relation for feeding a web of material therebetween, one of said rolls being a punch roll and the other a die roll,
said die roll having a pair of intersecting bores on opposite sides peripherally of and inclined toward a common roll radius therebetween at an angle $\alpha$,
complementary die members each comprising a substantially cylindrical button positioned one in each bore and projecting from the roll surface to define an arcuate V-shaped die portion,
said punch roll having an axial groove;
a punch block slidably disposed in said groove in an axial direction and having a pair of bores on opposite sides of and inclined the angle $\alpha$ away from a common die roll radius in the same plane as the punch roll radius,
complementary punch members each comprising a substantially cylindrical button having a peripheral lip disposed in overlapping mating relation with the arcuate V-shaped peripheral portion of the projecting die members,
means securing the punch members and the slidable punch block to the punch roll,
said angle $\alpha$ being defined as the angle between the leading edge of the punch and a line joining the tips of the punch and die when the die tip interference is a maximum.

7. In a rotary web feed and punch,
a pair of rolls disposed in predetermined spaced relation for feeding a web of card material therebetween,
gear means connecting the rolls to maintain them in fixed driving relation to each other,
complementary punch and die members each carried by a different one of said rolls disposed for overlapping non-contacting relation adjacent an edge of the web of material to produce an edge notch defining rounded corners of two adjacent lengths of said material,
one roll having a pair of adjoining circular bores disposed on opposite sides peripherally of a common roll radius therebetween and inclined toward the common radius by an angle $\alpha$,
said die member comprising a pair of cylindrical buttons of hardened material secured in and projecting from said bores and having the projecting end surfaces relieved to together provide an arcuate V-shaped die surface intersecting the edge of the web,
the other roll having an axial groove,
a punch block slidable axially in said groove and having complementary die bores disposed peripherally on opposite sides of a common roll radius therebetween and inclined away from said common radius by said angle $\alpha$,
said punch member comprising a pair of substantially cylindrical buttons of hardened material positioned in and projecting from the bores in the punch block, the projecting end portion of said punch buttons being relieved to define complementary arcuate lip portions together defining an arcuate V punch portion mating with the corresponding die portions in overlapping relation, said angle α being the angle between the leading edge of the punch and a line joining the tips of the leading edges of the punch and die when the interference therebetween is a maximum.

8. A rotary web feed and punch device comprising,
a frame of 36% nickel steel alloy material with a substantially zero temperature coefficient of expansion,
a pair of rolls rotatably supported in said frame in predetermined spaced relation for gripping a web of material therebetween in web feeding relation,
one of said rolls having a pair of cylindrical bores disposed in substantially abutting relation on opposite sides peripherally of a common roll radius and inclined toward from the common radius by an angle α,
a pair of substantially cylindrical hardened die buttons secured one in each of said bores and having one end projecting therefrom, each of said projecting ends being relieved to define substantially adjacent quadrant lip portions together forming an arcuate V-shaped die surface projecting inwardly from the edge of the web,
the other of said rolls having an axial groove on one side,
a punch block slidable axially in said groove and having a pair of adjoining cylindrical bores on opposite sides peripherally of a common roll radius therebetween, said bores being inclined away from the common roll radius the same angle α,
a pair of substantially cylindrical hardened punch buttons positioned one in each of the punch block bores each having a central opening and having an end projecting therefrom which is relieved to define adjacent quadrant lip portions for overlapping punching relation with the peripheral die button portions, and
screw means disposed in said central openings for securing the punch buttons and the punch block in fixed axial position to the roll with the punch button lip portions overlapping, non-contacting shear relation with the peripheral die button portions,
said angle α being the angle between the leading edge of the punch and a line joining the tips of the leading edges of the punch and die buttons when the interference therebetween is a maximum.

9. A rotary web feed and punch comprising,
a pair of rotatable feed rolls disposed in predetermined spaced relation for feeding a web of material therebetween,
one of said rolls having an axial groove,
a punch locator block disposed in said groove having a pair of cylindrical bores on opposite sides peripherally of a common roll radius therebetween, said bores being substantially tangential and inclined away from the common radius by an angle α,
a punch support block positioned underneath the punch block having a pair of plane support surfaces extending axially of the shaft and each inclined at the angle α,
a pair of identical substantially cylindrical punch buttons positioned one in each of said bores and having relieved end surfaces defining intersecting quadrature tip portions together forming an arcuate V-shaped punch surface intersecting the edge of the web,
the other of the rolls having corresponding cylindrical bores positioned on opposite sides peripherally of and inclined toward a common roll radius,
a pair of substantially cylindrical die buttons positioned in and projecting from the die roll bores and having relieved end portions defining intersecting arcuate lip portions in overlapping relation with the corresponding V-shaped die portions,
said angle α being the angular difference between the angle of the leading edge of the punch and a centerline joining the rolls when the punch tip interference is at a maximum and the angle between the roll centerline and a line joining the tips of the leading edges of the punch and die.

References Cited by the Examiner

UNITED STATES PATENTS

| 1,202,122 | 10/1916 | Swift | 83—345 |
| 3,143,022 | 8/1964 | Andersen | 83—670 |
| 3,192,810 | 7/1965 | Amato | 83—670 |
| 3,209,630 | 10/1965 | McCartan | 83—670 |

WILLIAM W. DYER, Jr., *Primary Examiner.*

L. TAYLOR, *Assistant Examiner.*